United States Patent
Takemoto

(10) Patent No.: US 9,345,963 B2
(45) Date of Patent: May 24, 2016

(54) COMPUTER-READABLE STORAGE MEDIUM, GAME APPARATUS, GAME SYSTEM AND GAME PROCESSING METHOD

(75) Inventor: Masataka Takemoto, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 25 days.

(21) Appl. No.: 13/359,111

(22) Filed: Jan. 26, 2012

(65) Prior Publication Data

US 2012/0302340 A1 Nov. 29, 2012

(30) Foreign Application Priority Data

May 24, 2011 (JP) .................................. 2011-115582

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/40 | (2014.01) |

(52) U.S. Cl.
CPC ........... *A63F 13/10* (2013.01); *A63F 2300/301* (2013.01); *A63F 2300/308* (2013.01); *A63F 2300/8088* (2013.01)

(58) Field of Classification Search
CPC ....... G06F 3/01; G06F 3/0481; G06F 3/0482; G06F 3/0484; A63F 2300/301; A63F 2300/308; A63F 2300/8088; A63F 13/10
USPC ............................................................ 463/2
See application file for complete search history.

(56) References Cited

U.S. PATENT DOCUMENTS

| | | | | |
|---|---|---|---|---|
| 7,789,741 | B1 * | 9/2010 | Fields et al. ..................... | 463/2 |
| 2007/0111794 | A1 * | 5/2007 | Hogan et al. .................... | 463/42 |

FOREIGN PATENT DOCUMENTS

| | | |
|---|---|---|
| JP | 2004-329744 | 11/2004 |
| JP | 2008-513167 | 5/2008 |
| WO | WO 2006/058408 | 6/2006 |

OTHER PUBLICATIONS

New Super Mario Bros., Wii Manual, Nintendo Co., Ltd., Dec. 3, 2009, p. 14, with partial translation.

* cited by examiner

*Primary Examiner* — Milap Shah
*Assistant Examiner* — Jason Pinheiro
(74) *Attorney, Agent, or Firm* — Nixon & Vanderhye P.C.

(57) ABSTRACT

A setting change image is displayed on an LCD of a terminal device while an in-play user is playing a game while viewing a game image displayed on a monitor. A user different from the in-play user can change various settings of the game without hindering the progress of the game performed by the in-play user, by operating the terminal device while viewing the setting change image displayed on the LCD, such as increasing the number of participants in the game, and changing difficulty level of the game.

22 Claims, 12 Drawing Sheets

COMPUTER-READABLE STORAGE MEDIUM, GAME APPARATUS, GAME SYSTEM AND GAME PROCESSING METHOD

CROSS REFERENCE TO RELATED APPLICATION

The disclosure of Japanese Patent Application No. 2011-115582, filed on May 24, 2011, is incorporated herein by reference.

FIELD

The exemplary embodiments disclosed herein relate to computer-readable storage media, game apparatuses, game systems, and game processing methods. More particularly, the exemplary embodiments relate to computer-readable storage media, game apparatuses, game systems, and game processing methods that can change settings of a game while the game is being played.

BACKGROUND AND SUMMARY

Conventionally, there are known games in which settings of a game (specifically, the number of players participating in the game) can be changed while the game is being played.

In a conventional game, when settings (specifically, the number of players participating in the game) of the game is to be changed during the game, the game currently being played is suspended, and an image for changing the settings (specifically, the number of players participating in the game) is displayed on the screen.

Therefore, there is a problem in that, for example, when a new user is going to participate in the game, the progress of the game being played by the user before the new user participates in the game is hindered.

An object of the exemplary embodiment is to provide a computer-readable storage medium, game apparatus, game system, and game processing method, which can change the settings of a game being played, without hindering the progress of the game.

The above object is attained by, for example, the following configurations.

A first configuration example is directed to a computer-readable storage medium having stored therein a game program executed by a computer of a game apparatus that performs game processing in accordance with an input from a portable display device that includes an predetermined input section and with an input from at least one input device, the game program causing the computer to function as: a first input receiving section, a game processing section, a first display control section, a second display control section, a second input receiving section, and a setting change section.

The first input receiving section is configured to receive an input from the input device. The game processing section is configured to perform predetermined game processing based on the input received by the first input receiving section. The first display control section is configured to generate a game image in accordance with a result of the game processing performed by the game processing section and to cause the game image to be displayed on a display device that is different from the portable display device. The second display control section is configured to cause, while the predetermined game processing is being performed without suspending processes performed by the first input receiving section, the game processing section, and the first display control section (hereinafter referred to as main processing), a setting image for changing a setting of the game processing to be displayed on the portable display device. The second input receiving section is configured to receive an input from the input section of the portable display device. The setting change section is configured to change a setting of the game processing based on the input received by the second input receiving section.

The setting change section may change a game performance condition used in the main processing.

The setting change section may change the number of participant in the game being performed by the main processing.

The setting change section may increase the number of participant in the game being performed by the main processing.

The second display control section may cause the portable display device to display a selection image for allowing a user who attempts to newly participate in the game being performed by the main processing to select an operation character.

The setting change section may reduce the number of participant in the game being performed by the main processing.

The second display control section may cause the portable display device to display a selection image for allowing a user to select an operation character that the user attempts to cause to leave the game being performed by the main processing.

The setting change section may change an operation character of a user participating in the game being performed by the main processing.

The setting change section may change a difficulty level of the game being performed by the main processing.

The game processing section may control one or more operation characters in a game world based on the input, from the at least one input device, received by the first input receiving section. Then, based on information indicating correspondence relationship between the at least one input device and the one or more operation characters, and based on the input received by the second input receiving section and an input from an input device that is not associated with any of the one or more operation characters, the setting change section may change a setting of the game processing.

The setting change section may increase the number of participants in the game being performed by the main processing, based on the input from the input device that is not associated with any of the one or more operation characters (hereinafter referred to as nonuse input device). Then, after the number of participant in the game has been increased by the setting change section, the game processing section may perform the game processing also based on the input from the nonuse input device.

The input section of the portable display device may include a pointing device. The second input receiving section may receive an input from the pointing device.

The second display control section may output the setting image to the portable display device by wireless transmission.

The second display control section may compress the setting image and may output a resultant image to the portable display device.

A second configuration example is directed to a game apparatus that performs game processing in accordance with an input from a portable display device that includes a predetermined input section and with an input from at least one input device. The game apparatus includes a first input receiving section, a game processing section, a first display control section, a second display control section, a second input receiving section, and a setting change section.

A third configuration example is directed to a game system that performs game processing in accordance with an input from a portable display device that includes a predetermined input section and with an input from at least one input device. The game apparatus includes a first input receiving section, a game processing section, a first display control section, a second display control section, a second input receiving section, and a setting change section.

A fourth configuration example is directed to a game processing method for performing game processing in accordance with an input from a portable display device that includes a predetermined input section and with an input from at least one input device.

The method includes: receiving an input from the at least one input device; performing predetermined game processing based on the received input; generating a game image in accordance with a result of the game processing; displaying the generated game image on a display device that is different from the portable display device; displaying, while the predetermined game processing is being performed without suspending the receiving the input, the game processing, the generating the game image, and the displaying the game image (hereinafter referred to as main processing), a setting image for changing a setting of the game processing on the portable display device; receiving an input from the input section of the portable display device; and changing a setting of the game processing based on the input received from the input section, wherein in the game processing, the game processing is performed based on a resultant setting due to the change, without suspending the main processing.

According to the exemplary embodiment, it is possible to change the setting of a game being played, without hindering the progress of the game.

These and other features, aspects and advantages of the exemplary embodiments will become more apparent from the following detailed description when taken in conjunction with the accompanying drawings.

DETAILED DESCRIPTION OF NON-LIMITING EXAMPLE EMBODIMENTS

Figure 1:
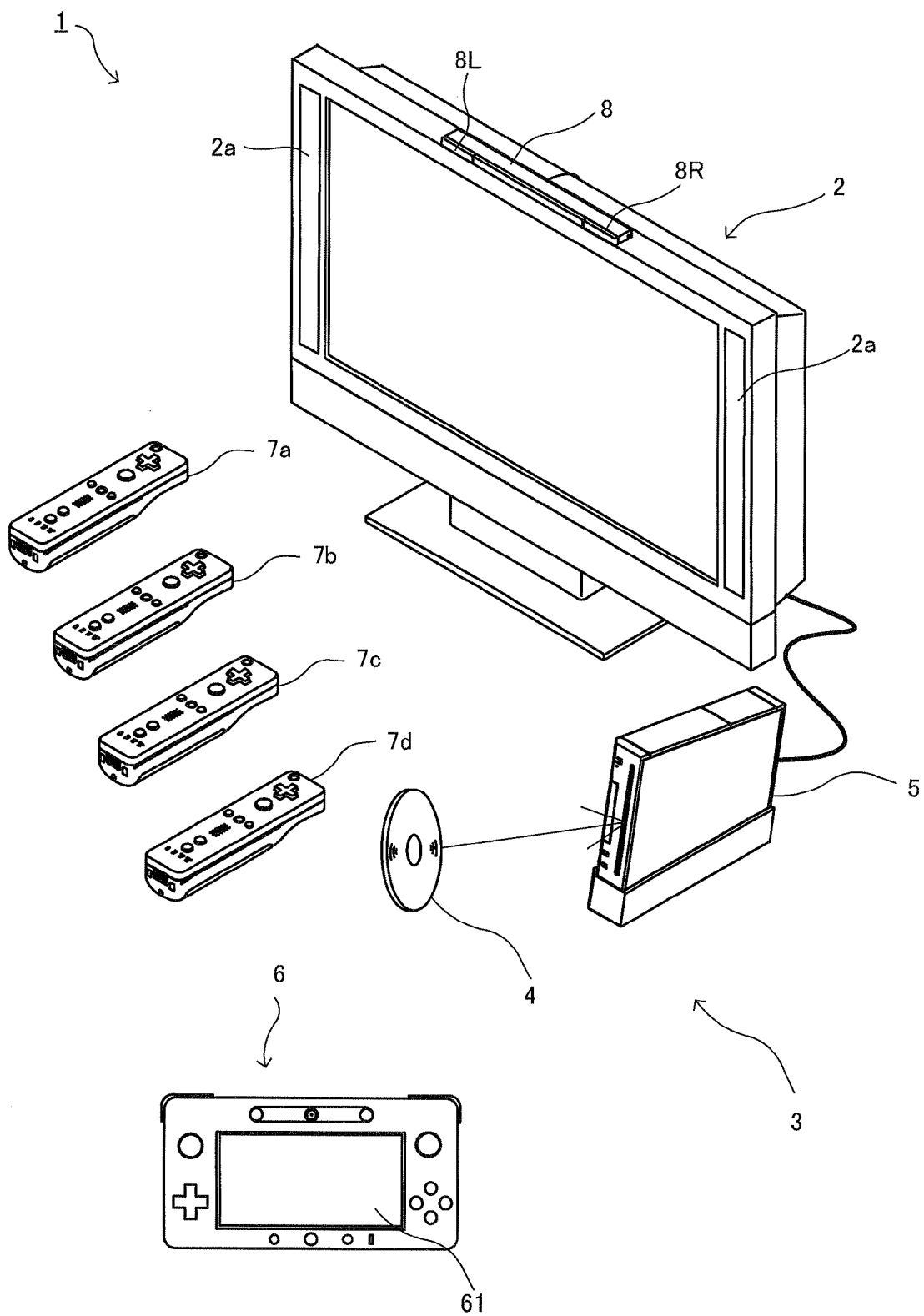
FIG. 1 is an external view showing a non-limiting example of a game system 1 according to an exemplary embodiment.

With reference to FIG. 1, a game system according to an exemplary embodiment will be described.

As shown in FIG. 1, a game system 1 includes a household television receiver (hereinafter, referred to as a monitor) 2 which is an example of display means, and a stationary game apparatus 3 connected to the monitor 2 via a connection cord. The monitor 2 includes loudspeakers 2a. The game apparatus 3 includes an optical disc 4, a game apparatus body 5, a terminal device 6, and controllers 7a to 7d (hereinafter these may be simply referred to as a controller 7 when they need not to be distinguished from each other).

The optical disc 4 has stored therein an information processing program (typically, a game program) to be executed by the game apparatus body 5.

The monitor 2 displays a game image outputted by the game apparatus body 5. The monitor 2 includes the loudspeakers 2a. The loudspeakers 2a each output a game sound outputted from the game apparatus body 5.

The game apparatus body 5 performs game processing and the like based on a game program or the like stored in the optical disc 4.

The controller 7 includes a plurality of operation sections (operation buttons). The controller 7 transmits to the game apparatus body 5 operation data (controller operation data) indicating an input state of the operation sections (whether each of the operation buttons has been pressed) using, for example, the technology of Bluetooth (registered trademark).

The controller 7 is provided with an imaging section for taking an image of a marker 8 including two LED modules (hereinafter, referred to as "markers") 8L and 8R provided in the vicinity of the display screen of the monitor 2 (above the screen in FIG. 1), and an imaging information calculation section for calculating the position of the marker in the taken image by the imaging section. The position of the marker calculated by the imaging information calculation section is transmitted to the game apparatus body 5 as marker coordinate data. The game apparatus body 5 can calculate the movement, position, attitude and the like of the controller 7 based on the marker coordinate data.

Moreover, the controller 7 is provided with an acceleration sensor and a gyro sensor. Acceleration data indicating the acceleration detected by the acceleration sensor and angular velocity data indicating the angular velocity detected by the gyro sensor are transmitted to the game apparatus body 5. The game apparatus body 5 can calculate the orientation and movement of the controller 7, based on the acceleration data and/or angular velocity data.

The terminal device 6 is a portable device that is small enough to be held by a user, and the user is allowed to move the terminal device 6 with hands, or place the terminal device 6 at any location. Although a specific structure of the terminal device 6 will be described later, the terminal device 6 includes an LCD (Liquid Crystal Display) 61 as display means, and input means (a touch panel 62, a gyro sensor 604, and the like described later). The terminal device 6 and the game apparatus body 5 are communicable with each other wirelessly or via a cable. The terminal device 6 receives, from the game apparatus body 5, data of an image (e.g., a game image) generated in the game apparatus body 5, and displays the image represented by the data on an LCD 61. Although in the exemplary embodiment an LCD is used as a display device, the terminal device 6 may include any other display device, such as a display device utilizing EL (Electro Luminescence), for example. Further, the terminal device 6 transmits, to the game apparatus body 5, operation data representing the content of an operation performed on the terminal device 6.

Figure 2:
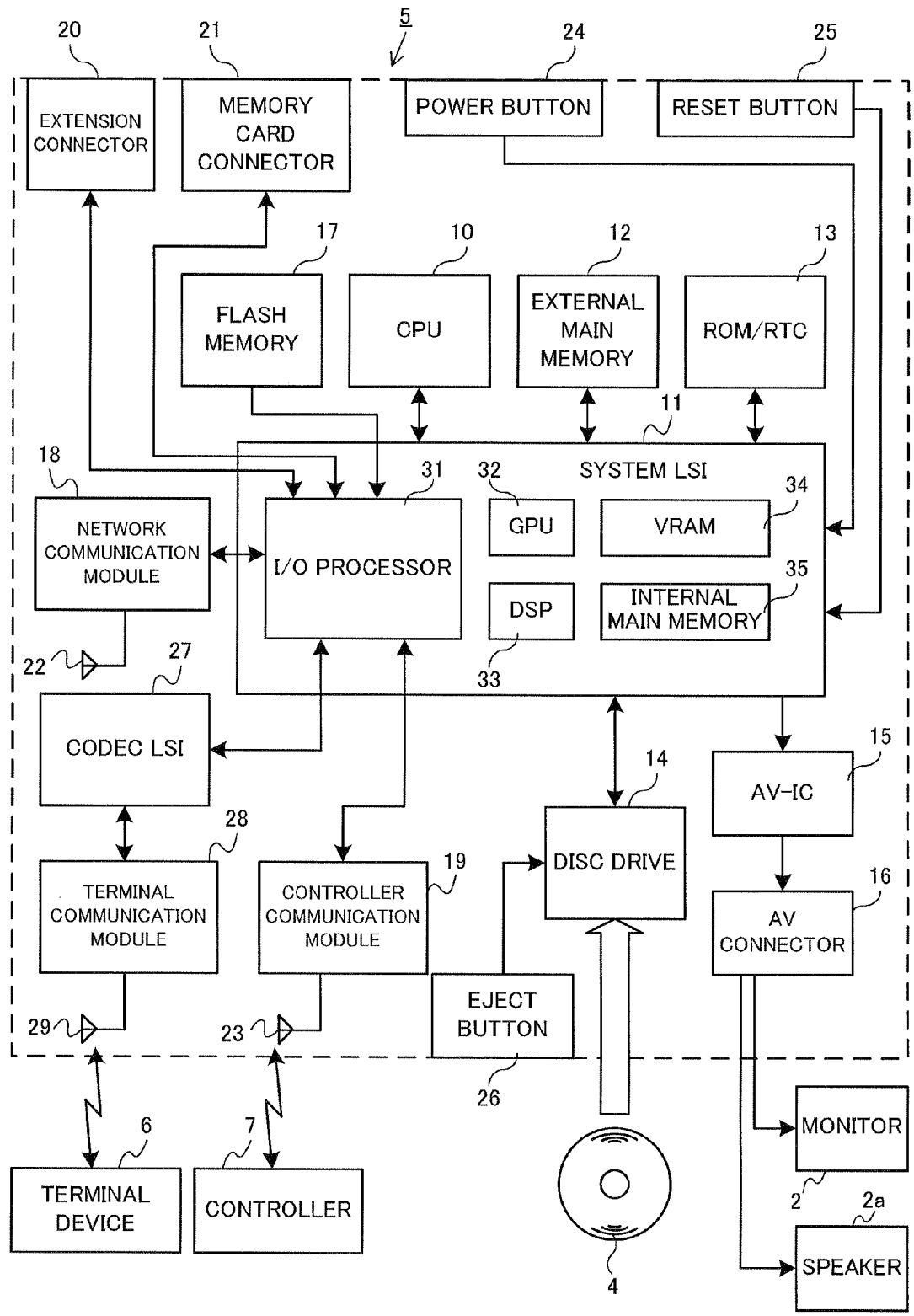
FIG. 2 is a functional block diagram showing a non-limiting example of a game apparatus body 5 shown in FIG. 1.

Next, with reference to FIG. 2, an internal structure of the game apparatus body 5 will be described. FIG. 2 is a block diagram illustrating an example of an internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

In addition to the CPU 10, the external main memory 12, the ROM/RTC 13, the disc drive 14, and the AV-IC 15 are connected to the system LSI 11. The external main memory 12, which is a volatile memory, is used as a work area and a buffer area for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35.

The GPU 32 generates an image in accordance with a graphics command (draw command) supplied from the CPU 10. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image", and the game image to be displayed on the terminal device 6 may be referred to as a "terminal game image".

The DSP 33, serving as an audio processor, generates sound data by using sound data and sound waveform (tone quality) data stored in the internal main memory 35 and the external main memory 12. In the exemplary embodiment, similarly to the game images, both a game sound to be outputted from the loudspeakers 2a of the monitor 2 and a game sound to be outputted from the loudspeakers of the terminal device 6 may be generated. Hereinafter, the game sound to be outputted from the monitor 2 may be referred to as a "monitor game sound", and the game sound to be outputted from the terminal device 6 may be referred to as a "terminal game sound".

Among the image data and sound data generated by the game apparatus body 5, the image data and sound data to be outputted to the monitor 2 are read by the AV-IC 15. Through an AV connector 16, the AV-IC 15 outputs the read image data to the monitor 2 and outputs the read sound data to the loudspeakers 2a included in the monitor 2. Thereby, an image is displayed on the monitor 2, and a sound is outputted from the loudspeakers 2a.

Further, among the image data and sound data generated by the game apparatus body 5, the image data and sound data to be outputted to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. The codec LSI 27 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7. That is, the I/O processor 31 receives, via the antenna 23 and the controller communication module 19, operation data or the like transmitted from the controller 7, and stores (temporarily) the data in a buffer region of the internal main memory 35 or the external main memory 12.

The game apparatus body 5 is capable of transmitting/receiving image data, sound data and the like to/from the terminal device 6. The I/O processor 31 outputs data of a game image (terminal game image) generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via the antenna 29. Therefore, in the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data (terminal game sound) generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6, according to need. The control data represent control instructions for the components included in the terminal device 6, such as an instruction to control on/off of a marker section (a marker section 65 shown in FIG. 5), and an instruction to control image taking of a camera (a camera 66 shown in FIG. 5). The I/O processor 31 transmits the control data to the terminal device 6 in response to an instruction from the CPU 10.

The game apparatus body 5 can receive various data from the terminal device 6. Although details will be described later, in the exemplary embodiment, the terminal device 6 transmits operation data, image data, and sound data. The respective data transmitted from the terminal device 6 are received by the terminal communication module 28 via the antenna 29. The image data and sound data transmitted from the terminal device 6 have been subjected to a similar compression process to that for the image data and sound data transmitted from the game apparatus body 5 to the terminal device 6. Accordingly, these image data and sound data are transmitted from the terminal communication module 28 to the codec LSI 27, and subjected to a decompression process by the codec LSI 27. The decompressed data are outputted to the I/O processor 31. The operation data, which has been received by the terminal communication module 28, is outputted to the I/O processor 31 via the codec LSI 27. The I/O processor 31 stores (temporarily) the data received from the terminal device 6 in the buffer region of the internal main memory 35 or the external main memory 12.

The game apparatus body 5 is connectable to other devices and external storage media via the extension connector 20 and the memory card connector 21.

The game apparatus body 5 includes (on the front main surface thereof, for example) a power button 24, a reset button 25, an insertion slot in which the optical disc 4 is inserted, an eject button 26 for ejecting the optical disc 4 from the insertion slot of the game apparatus body 5, and the like.

In another embodiment, some of the components of the game apparatus body 5 may be constituted as an extension device separated from the game apparatus body 5. At this time, the extension device may be connected to the game apparatus body 5, for example, via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above-mentioned, the game apparatus body can be made communicable with the terminal device 6.

Figure 3:
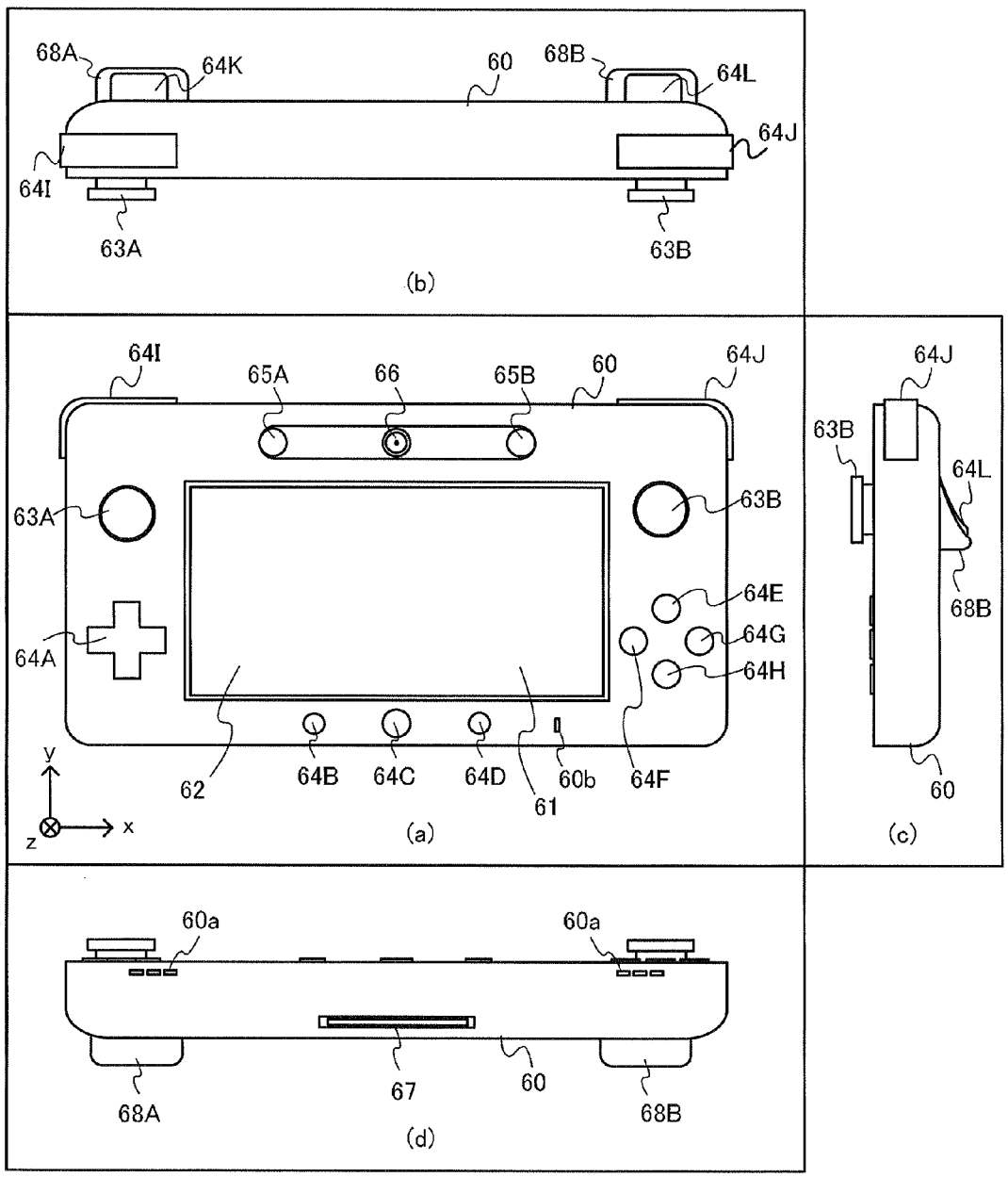
FIG. 3 is a diagram showing a non-limiting example of an external structure of a terminal device 6 shown in FIG. 1.
Figure 4:
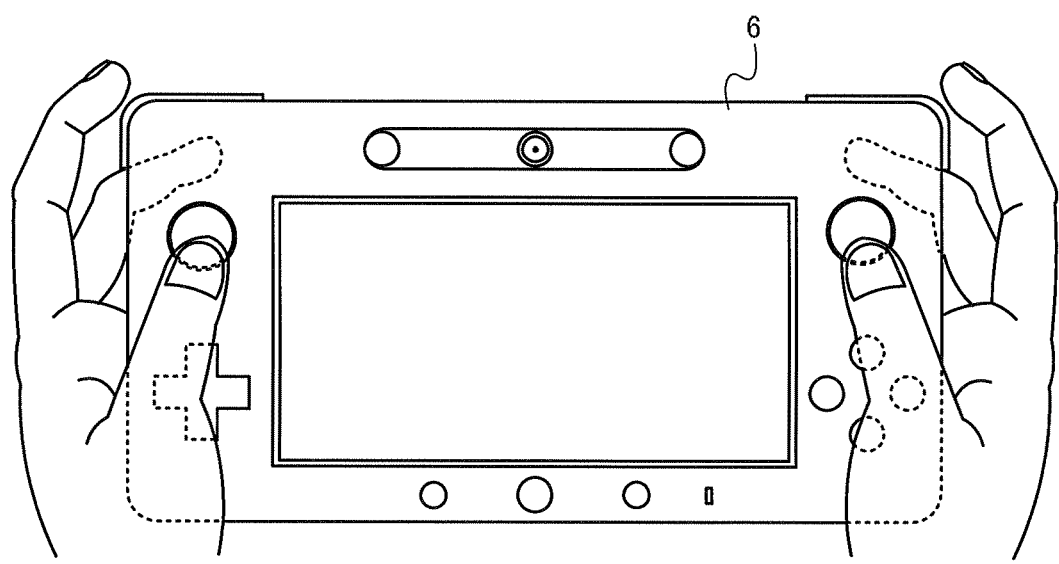
FIG. 4 is a diagram showing a non-limiting example of a state where a user holds the terminal device 6.

Next, a structure of the terminal device 6 will be described with reference to FIGS. 3 to 5. FIG. 3 is a diagram illustrating an example of an external structure of the terminal device 6. More specifically, (a) of FIG. 3 is a front view of the terminal device 6, (b) of FIG. 3 is a top view, (c) of FIG. 3 is a right side view, and (d) of FIG. 3 is a bottom view. FIG. 4 shows an example of a state in which a user holds the terminal device 6 with both hands.

As shown in FIG. 3, the terminal device 6 includes a housing 60 which generally has a horizontally long plate-like rectangular shape. The housing 60 is small enough to be held by the user.

The terminal device 6 includes the LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal device 6 while viewing a screen of the LCD 61.

As shown in (a) of FIG. 3, the terminal device 6 includes, as operation means, a touch panel 62 on the screen of the LCD 61. In the exemplary embodiment, the touch panel 62 is, but is not limited to, a resistive film type touch panel. A touch panel of any type, such as electrostatic capacitance type, may be used. The touch panel 62 may be of single touch type or multiple touch type. In the exemplary embodiment, the touch panel 62 has the same resolution (detection accuracy) as that of the LCD 61. However, the resolution of the touch panel 62 and the resolution of the LCD 61 need not be the same. Since the terminal device 6 has the touch panel 62, the user is allowed to operate the touch panel 62 while moving the terminal device 6. That is, the user is allowed to directly (by using the touch panel 62) perform an input onto the screen of the LCD 61 while moving the LCD 61.

As shown in FIG. 3, the terminal device 6 has, as operation means, two analog sticks 63A and 63B, and a plurality of operation buttons 64A to 64L. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60.

The respective operation buttons 64A to 64L are assigned functions, according to need, in accordance with a game program. For example, the cross button 64A may be used for direction designation operation, selection operation, and the like, and the operation buttons 64E to 64H may be used for determination operation, cancellation operation, and the like.

As shown in (a) of FIG. 3, the terminal device 6 includes a marker section (the marker section 65 shown in FIG. 5) including a marker 65A and a marker 65B, on the front surface of the housing 60. The markers 65A and 65B are each constituted by one or more infrared LEDs. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal device 6 includes the camera 66. The camera 66 is provided on the front surface of the housing 60. Accordingly, the camera 66 is capable of taking an image of the face of the user holding the terminal device 6. For example, the camera 66 can take an image of the user who is playing a game while viewing the LCD 61.

The terminal device 6 has a microphone (a microphone 609 shown in FIG. 5) as sound input means. The microphone 609 is embedded in the housing 60 at a position inside a microphone hole 60b. The microphone 609 detects for a sound, such as user's voice, around the terminal device 6.

Figure 5:
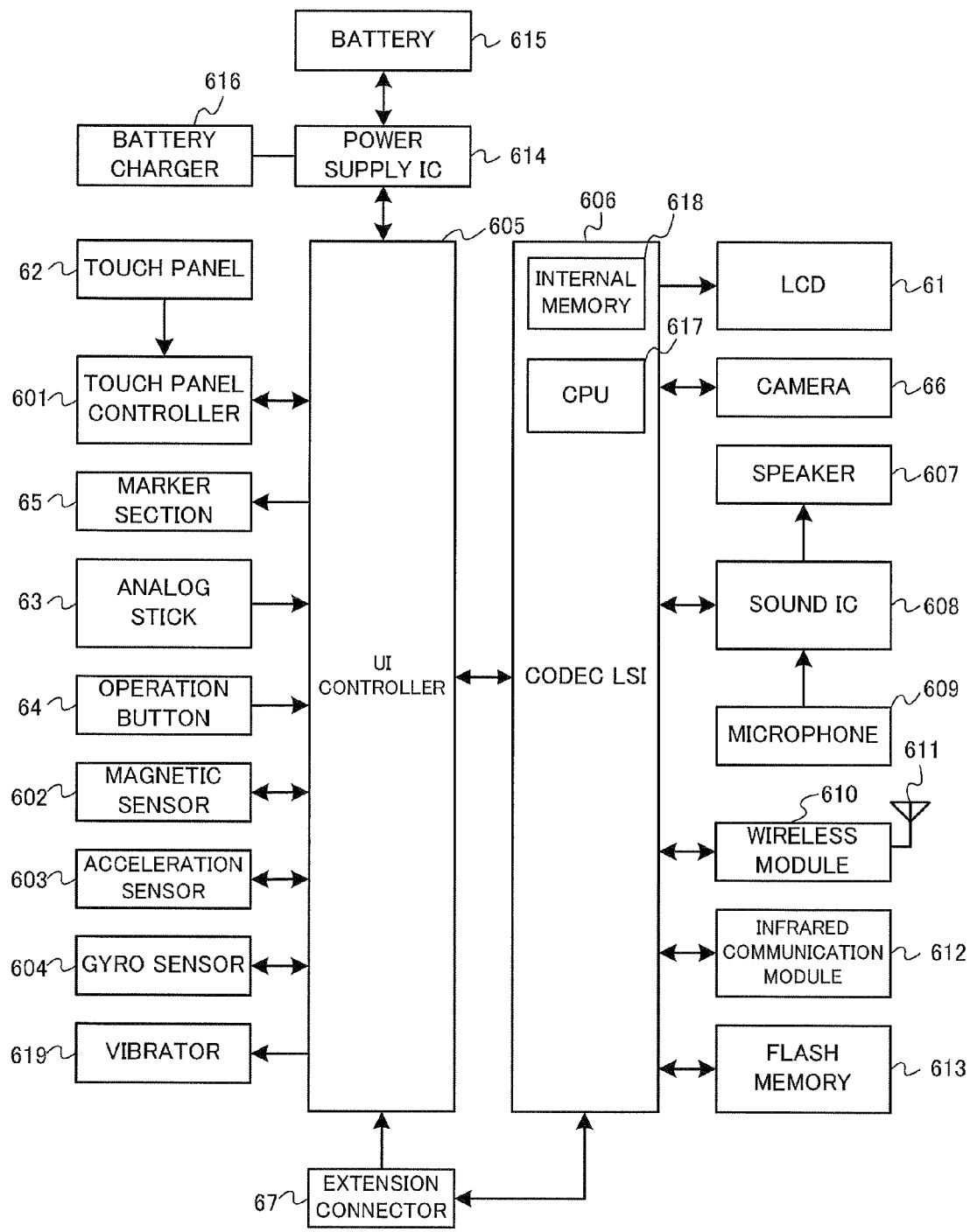
FIG. 5 is a block diagram showing a non-limiting example of an internal structure of the terminal device 6 shown in FIG. 3.

The terminal device 6 has loudspeakers (loudspeakers 607 shown in FIG. 5). Sound is outputted through speaker holes 60a from the loudspeakers 607 provided in the lower side surface of the housing 60.

The terminal device 6 includes an extension connector 67 for connecting another device to the terminal device 6.

In the terminal device 6 shown in FIG. 3, the shapes of the operation buttons and the housing 60, the number of the respective components, and the positions in which the components are provided are merely examples. The shapes, numbers, and positions may be different from those described above.

Next, an internal structure of the terminal device 6 will be described with reference to FIG. 5. FIG. 5 is a block diagram illustrating an example of an internal structure of the terminal device 6. As shown in FIG. 5, the terminal device 6 includes, in addition to the components shown in FIG. 3, a touch panel controller 601, a magnetic sensor 602, the gyro sensor 604, a user interface controller (UI controller) 605, a codec LSI 606, the loudspeakers 607, a sound IC 608, the microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, the analog stick 63 (the analog sticks 63A and 63B), the operation button 64 (the operation buttons 64A to 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable.

The touch panel controller 601 is a circuit which is connected to the touch panel 62 and controls the touch panel 62. The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions are outputted from the UI controller 605 to the touch panel controller 601.

The analog stick 63 outputs, to the UI controller 605, stick data representing a direction in which the stick part slides (or tilts), and an amount of the sliding (tilting). The operation button 64 outputs, to the UI controller 605, operation button data representing an input state of each of the operation buttons 64A to 64L (whether or not the operation button is pressed).

The magnetic sensor 602 detects the magnitude and direction of a magnetic field to detect an orientation. Orientation data representing the detected orientation is outputted to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a Hall sensor, a GMR (Giant Magneto Resistance) sensor, a TMR (Tunneling Magneto Resistance) sensor, and an AMR (Anisotropic Magneto Resistance) sensor. However, any sensor may be adopted as long as the sensor can detect an orientation.

The acceleration sensor 603 is provided inside the housing 60. The acceleration sensor 603 detects the magnitudes of linear accelerations along three axial directions (xyz axial directions shown in (a) of FIG. 3), respectively. Acceleration data representing the detected accelerations is outputted to the UI controller 605. The UI controller 605 outputs, to the acceleration sensor 603, a control instruction for the acceleration sensor 603.

The gyro sensor 604 is provided inside the housing 60. The gyro sensor 604 detects the angular velocities around the three axes (the above-described xyz axes), respectively. Angular velocity data representing the detected angular velocities is outputted to the UI controller 605. The UI controller 605 outputs, to the gyro sensor 604, a control instruction for the gyro sensor 604.

The vibrator 619 is, for example, a vibration motor or a solenoid. The terminal device 6 is vibrated by actuating the vibrator 619 in accordance with a control instruction outputted from the UI controller 605 to the vibrator 619.

The UI controller 605 outputs, to the codec LSI 606, the operation data including the touch position data, the stick data, the operation button data, the orientation data, the acceleration data, and the angular velocity data (hereinafter referred to as terminal operation data), which have been received from the respective components.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal device 6 is configured not to perform a game process, the terminal device 6 may execute a program for managing the terminal device 6 or a program for communication. For example, a program stored in the flash memory 613 is loaded into the internal memory 618 and executed by the CPU 617 when the terminal device 6 is powered on, thereby starting up the terminal device 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is a circuit for controlling input of sound data from the microphone 609 to the codec LSI 606 and output of sound data from the codec LSI 606 to the loudspeakers 607.

The codec LSI 606 transmits the image data from the camera 66, the sound data from the microphone 609, and the operation data from the UI controller 605 (terminal operation data), to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are outputted to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE802.11n standard.

As described above, the transmission data transmitted from the terminal device 6 to the game apparatus body 5 includes the terminal operation data, the image data, and the sound data. If another device is connected to the terminal device 6 through the extension connector 67, data received from the other device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, according to need.

As described above, the compressed image data and sound data are transmitted from the game apparatus body 5 to the terminal device 6. These data are received by the codec LSI 606 through the antenna 611 and the wireless module 610. The codec LSI 606 decompresses the received image data and sound data. The decompressed image data is outputted to the LCD 61, and an image according to the image data is displayed on the LCD 61. On the other hand, the decompressed sound data is outputted to the sound IC 608, and a sound based on the sound data is outputted from the loudspeakers 607.

When control data is included in the data received from the game apparatus body 5, the codec LSI 606 and the UI controller 605 provide control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal device 6. In the exemplary embodiment, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 6 to the game apparatus body 5.

Next, with reference to FIG. 6 to FIG. 11, the outline of the game processing performed in the game system of the exemplary embodiment will be described.

In the game system of the exemplary embodiment, while one or more users (in-play users) are playing a game using respective controllers 7, another user (observing user) can change various settings of the game, such as new participation in the game while the game is being played (this may be simply referred to "participation during the game") or change of the difficulty level of the game, by using the terminal device 6.

Figure 6:
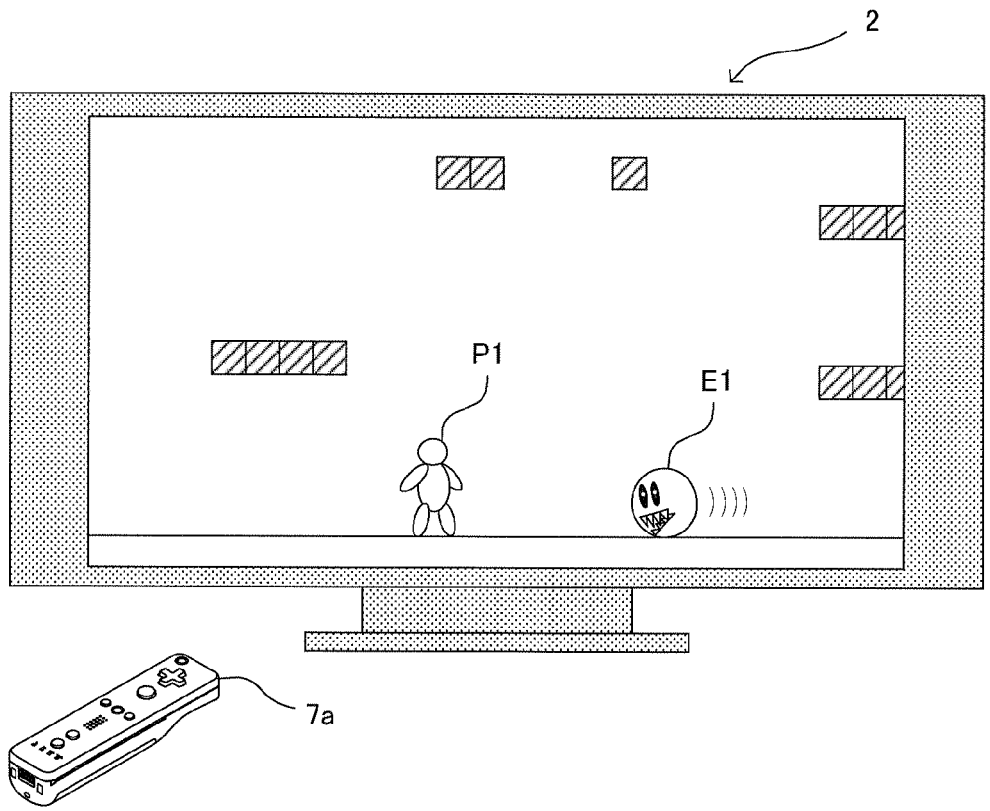
FIG. 6 is a non-limiting example of a monitor game image displayed on a monitor 2.

FIG. 6 shows an example of a monitor game image displayed on the monitor 2 when a user (hereinafter referred to as in-play user) is playing by operating a player character P1, using the controller 7a. A game world is displayed in the monitor game image. The player character P1, an enemy character E1, and the like exist in the game world. The player character P1 is a character operated by the in-play user. The enemy character E1 is controlled by a computer based on a predetermined algorithm. The in-play user operates the controller 7 while viewing the monitor game image displayed on the monitor 2.

Figure 7:
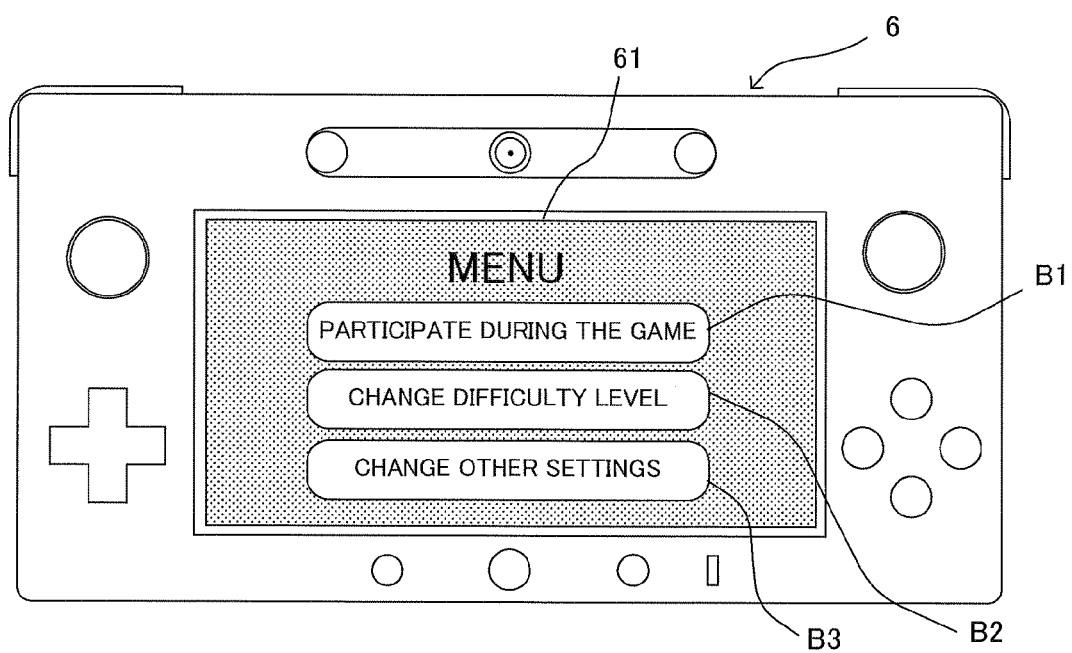
FIG. 7 is a non-limiting example of a terminal game image displayed on an LCD 61.

While the in-play user is playing the game, a terminal game image (setting change image) as shown in FIG. 7 is displayed on the LCD 61 of the terminal device 6. Another user (hereinafter referred to as observing user), who is different from the in-play user, can change various settings of the game by operating the terminal device 6 while viewing the setting change image displayed on the LCD 61.

While the in-play user is playing the game, a menu image, which is basically the same as that shown in FIG. 7, is displayed on the LCD 61. In another exemplary embodiment, no image may be displayed on the LCD 61 basically while an in-play user is playing a game, and only after an observing user touches the touch panel 62, a menu image as shown in FIG. 7 may be displayed.

The menu image shown in FIG. 7 displays thee button images B1 to B3 corresponding to three items, that is, "participate during the game", "change difficulty level", and "change other settings", respectively.

The button image B1 is selected when the number of participants in the game is to be changed, that is, when the observing user is to newly participate in the game while the in-play user is playing the game.

The button image B2 is selected in the case where, while the in-play user is playing the game, when the observing user is to change the difficulty level of the game.

The button image B3 is selected when the observing user is to change other settings of the game (for example, when changing the type of the player character being operated by the in-play user, or when reducing the number of participants in the game).

The observing user can select a button image of a desired item from the menu image, by using the touch panel 62. Although details will be described later, the observing user may select a button image of a desired item from the menu image, by using a controller 7 that is not being used by the in-play user (for example, when the controller 7a among the controllers 7a to 7d is being used by the in-play user as shown in FIG. 6, one of the controllers 7b to 7d may be used). In another exemplary embodiment, a button image of a desired item may be selected from the menu image, by using the operation button 64 of the terminal device 6, or the operation button or the like of a controller 7 that is not being used by the in-play user.

Figure 8:
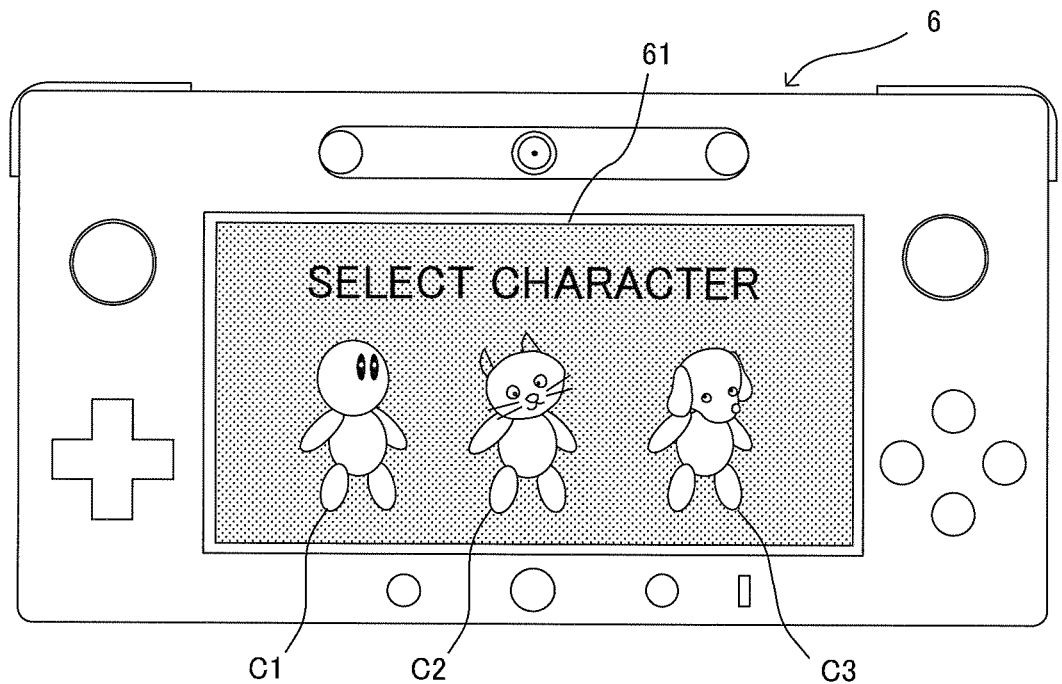
FIG. 8 is a non-limiting example of a terminal game image displayed on the LCD 61.

In FIG. 7, when the observing user touches the button image B1, for example, a character selection image as shown in FIG. 8 is displayed on the LCD 61. The character selection image shows a plurality of characters C1 to C3 and the observing user can select a desired character from these characters C1 to C3, as a player character that the observing user is to operate. As in the case of the menu image, selection of a character in the character selection image is performed by use of the touch panel 62 or the like.

Figure 9:
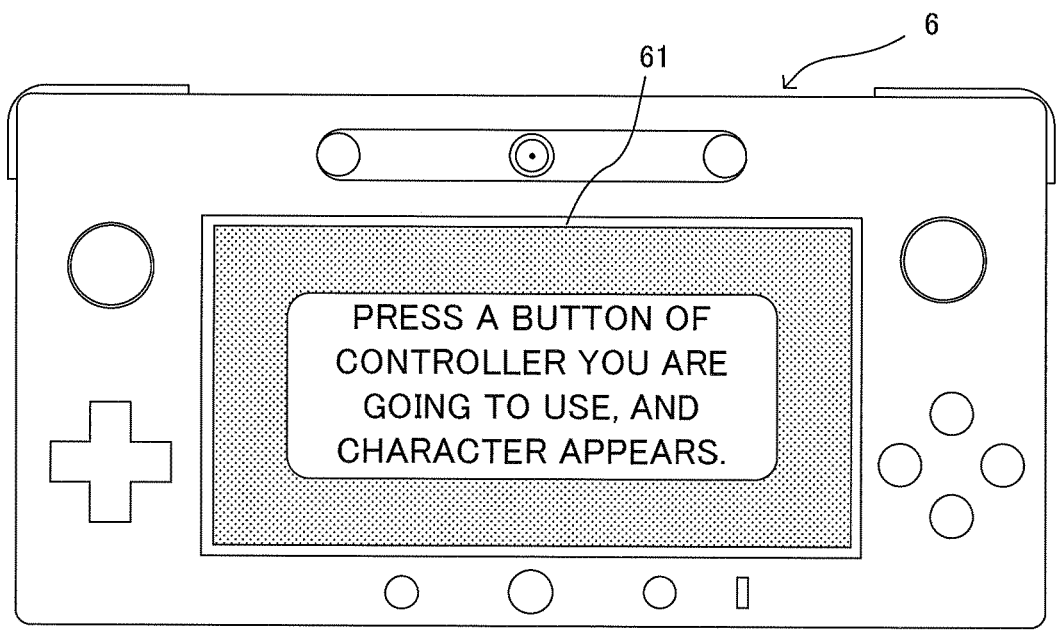
FIG. 9 is a non-limiting example of a terminal game image displayed on the LCD 61.

When the observing user touches a desired character (for example, character C3), a message instructing the observing user to press a predetermined button (for example, the A button) of the controller 7 that the observing user is to use when playing the game is displayed on the LCD 61 as shown in FIG. 9. Causing the observing user to press the predetermined button of the controller 7 to be used in the game play as described above is an example of a method for allowing the game system to understand which of the controllers 7 is to be used by the user.

Figure 10:
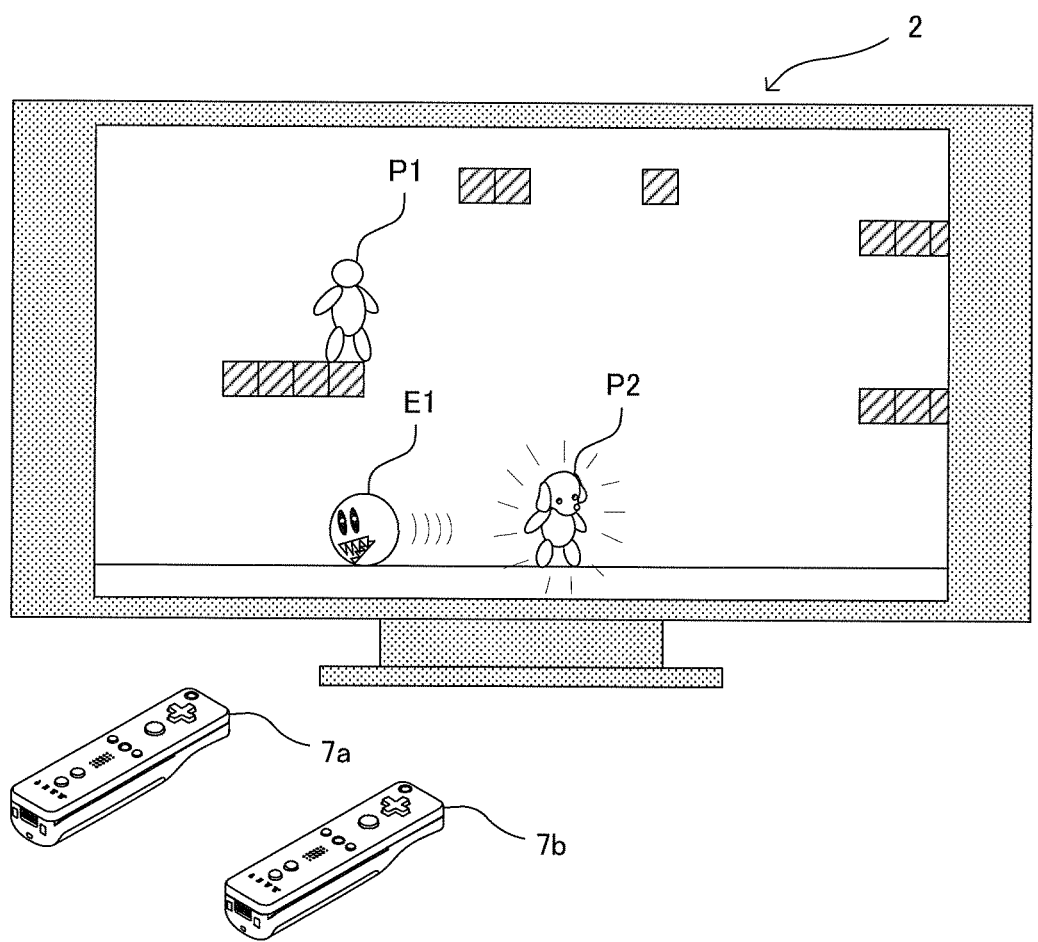
FIG. 10 is a non-limiting example of a monitor game image displayed on the monitor 2.

In response to the message shown in FIG. 9, the observing user releases the terminal device 6 to hold the desired controller (for example, the controller 7b) and presses the A button of the controller 7b, and then, the character selected in the character selection image (for example, character C3) appears in the game world as a player character P2 to be operated by the controller 7b, as shown in FIG. 10.

Figure 11:
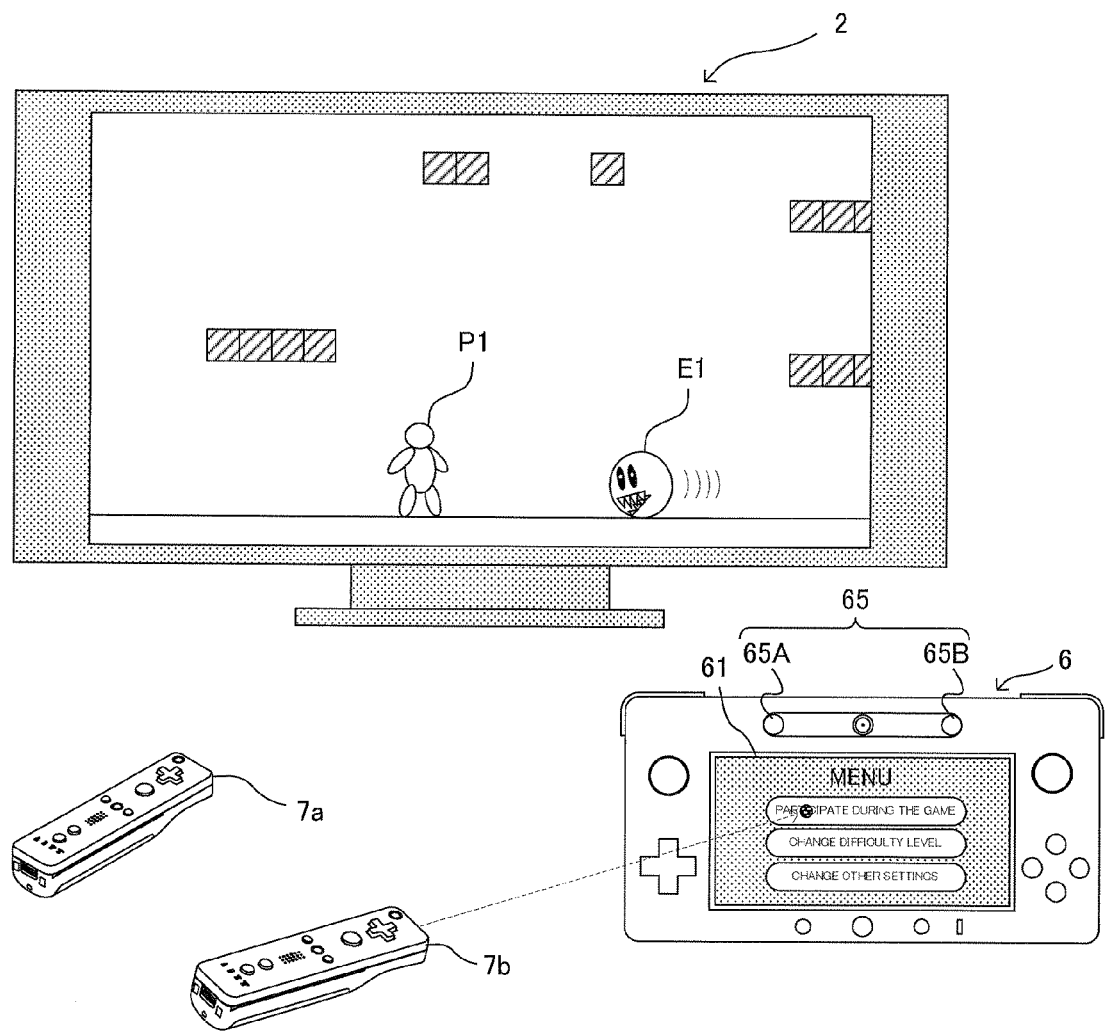
FIG. 11 is a diagram showing a non-limiting example of an operation method of the terminal device 6.

It should be noted that in the exemplary embodiment, as described above, the observing user can select a desired item by using a controller 7 that is not being used by the in-play user, and can select a desired character. For example, as shown in FIG. 11, the observing user may hold a desired controller among controllers that are not being used by the in-play user (for example, the controller 7b), and can give an instruction to "participate during the game" (select a character, or the like) by using the controller 7b instead of the touch panel 62. In this case, since it is obvious that the observing user attempts to play the game using the controller 7b, the confirmation operation as shown in FIG. 9 can be omitted. Moreover, the observing user can smoothly participate in the game without doing the action of releasing the terminal device 6 to hold the controller 7b. In the example shown in FIG. 11, the desired item is selected by use of the controller 7b, utilizing the marker section 65 of the terminal device 6. However, in another exemplary embodiment, the desired item may be selected by moving a cursor displayed on the LCD 61, by means of an operation button of the controller 7b.

Although not shown, when the observing user touches the button image B2 in FIG. 7, an image for allowing the observing user to select a difficulty level is displayed on the LCD 61. Upon a difficulty level being designated by the observing user, the difficulty level of the game being played is switched to the difficulty level updated by the observing user. For example, when the difficulty level is changed to a higher level, the moving speed of the enemy character E1 becomes faster from that moment.

It should be noted that in FIG. 7, when the observing user (or one of at least one in-play user) touches the button image B3, he or she can change the type of the player character of an in-play user, or can reduce the number of participants in the game. When the type of the player character operated by an in-play user is to be changed, an image that allows the user to select the player character the type of which the user wants to change, and an image that allows the user to select a desired character are sequentially displayed on the LCD 61, for example. When the number of participants in the game is to be reduced, an image that allows a user (the observing user or an in-play user) to select the player character of an in-play user that the user attempts to cause to leave the game is displayed on the LCD 61, for example.

In the exemplary embodiment, even while the observing user is changing the settings of the game with reference to the setting change images as shown in FIG. 7 to FIG. 9, the progress of the game being played by the in-play user is not suspended. That is, the control of the player character P1 based on the operation data from the controller 7a, the control of the enemy character E1, and update of the monitor game image are performed without being suspended.

Next, with reference to FIG. 12 to FIG. 14, the operation of the game system 1 for realizing the above game will be described in detail.

Figure 12:
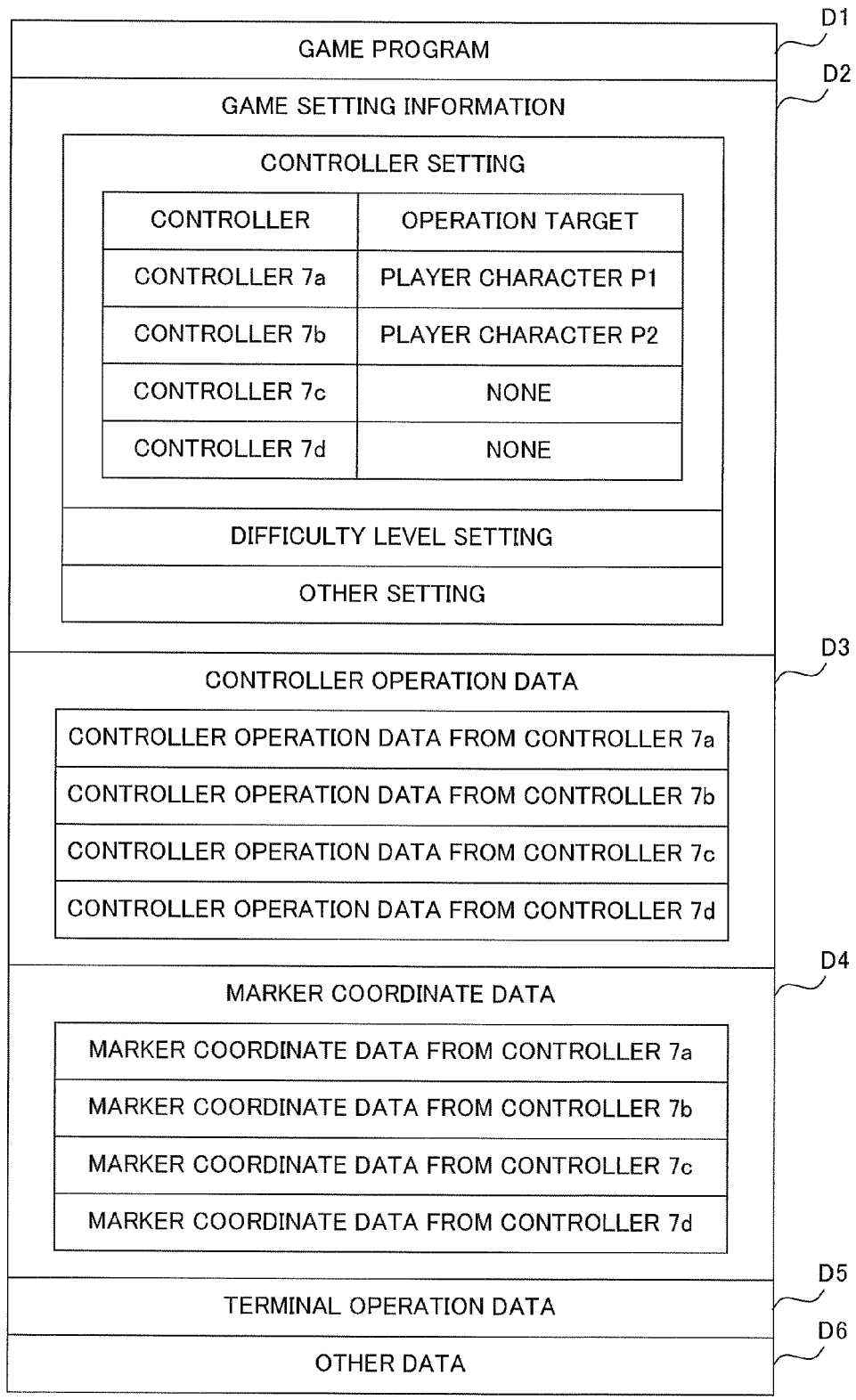
FIG. 12 is a non-limiting example of a memory map of an external main memory 12.

FIG. 12 shows an example of various data stored in the external main memory 12 of the game apparatus body 5 when the above game is performed.

A game program D1 is a program for causing the CPU 10 of the game apparatus body 5 to perform the game processing for realizing the game. The game program D1 is loaded, for example, from the optical disc 4 to the external main memory 12.

Game setting information D2 is information of various settings regarding the game (game performance condition). The game setting information D2 includes a controller setting, a difficulty level setting, and other settings. The controller setting is information indicating for which player character operations the respective controllers 7a to 7d are used (in other words, use state of each controller 7). The difficulty level setting is information indicating the difficulty level of the game Controller operation data D3 is operation data periodically transmitted by each of the controllers 7a to 7d.

Marker coordinate data D4 is marker coordinate data periodically transmitted by each of the controllers 7a to 7d. The marker coordinate data D4 is coordinate data indicating the position of the marker (the markers 65A and 65B of the terminal device 6) in an image taken by the imaging section of each of the controllers 7a to 7d.

Terminal operation data D5 is operation data periodically transmitted by the terminal device 6. As described above, the terminal operation data D5 includes the touch position data and the like.

Other data D6 is various data used in the game processing, such as image data, the current position of player characters, and the like.

Next, with reference to the flowchart shown in FIG. 13 to FIG. 14, the flow of the game processing performed by the CPU 10 of the game apparatus body 5 based on the game program D1 will be described.

Figure 13:
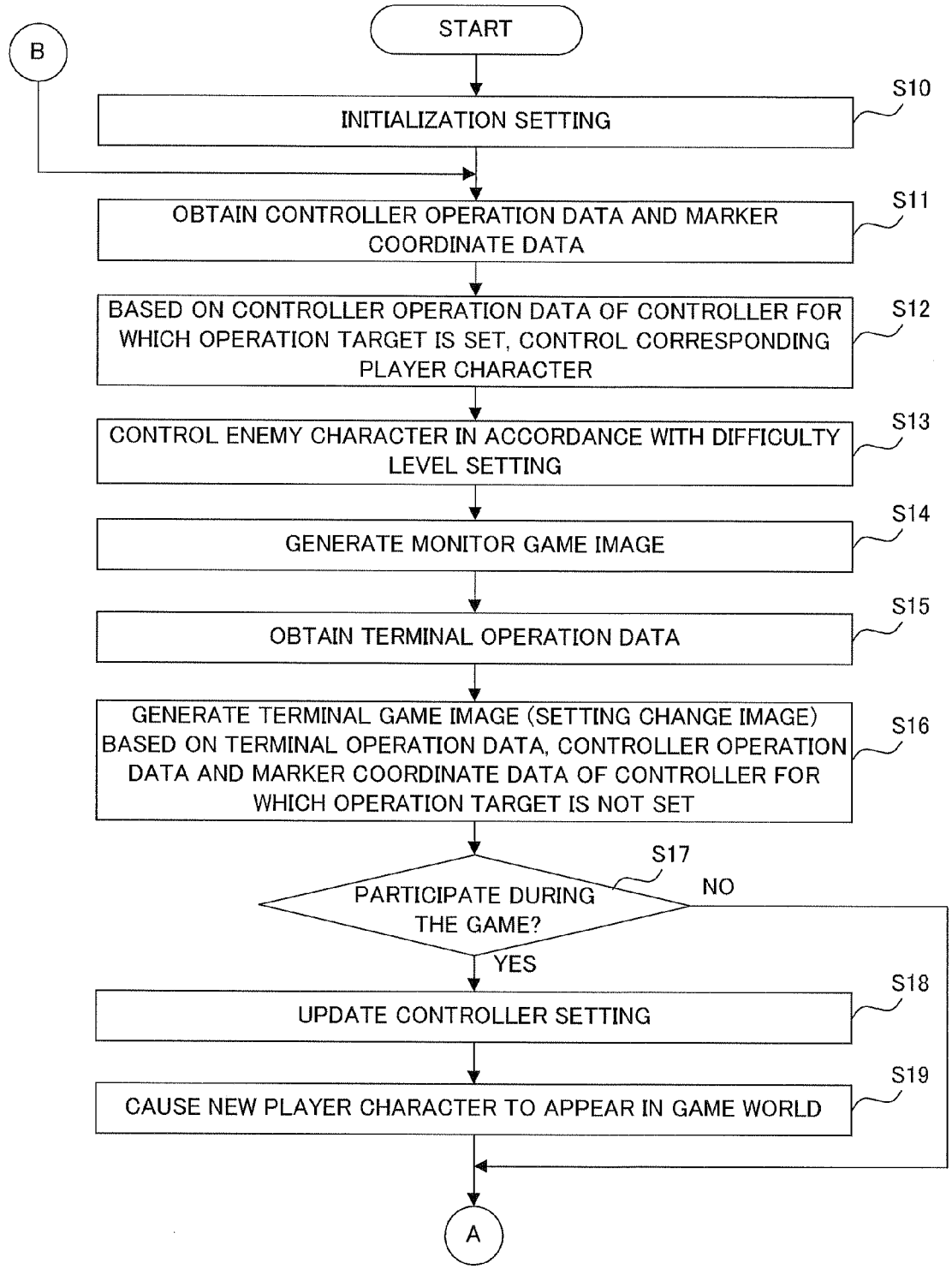
FIG. 13 is a part of a non-limiting example of a flowchart showing a flow of game processing based on a game program D1.

When the game program D1 is started, first, in step S10 in FIG. 13, the CPU 10 performs an initialization setting. In the initialization setting, a process of setting the number of participants in the game (the number of participants at the start of the game) based on an instruction from each user, a process of setting the type of a player character operated by each user, a process of setting a difficulty level of the game, a process of arranging the player characters and an enemy character at initial positions in the game world, and the like. Then, the game setting information D2 corresponding to the result of the initialization setting is stored in the external main memory 12.

In step S11, the CPU 10 obtains the controller operation data D3 and the marker coordinate data D4 from each of the controllers 7a to 7d.

In step S12, the CPU 10 refers to the controller setting in the game setting information D2 and finds a controller 7, among the controllers 7a to 7d, for which an operation target is set (that is, the controller used by an in-play user). Then, based on the controller operation data D3 of the controller 7 for which the operation target is set, the CPU controls the corresponding player character, which is the operation target of the controller 7.

In step S13, in accordance with the difficulty level setting in the game setting information D2, the CPU 10 controls the enemy character based on a predetermined algorithm. For example, the CPU 10 controls the enemy character such that the higher the difficulty level is, the faster the speed of the enemy character becomes.

In step S14, the CPU 10 generates a monitor game image. The generated monitor game image is outputted from the game apparatus body 5 to the monitor 2, and is displayed on the monitor 2. A part or the whole of the process of generating the monitor game image may be performed by the GPU 32 in accordance with an instruction from the CPU 10.

In step S15, the CPU 10 obtains the terminal operation data D5 from the terminal device 6

In step S16, the CPU 10 refers to the controller setting in the game setting information D2, and finds a controller 7, among the controllers 7a to 7d, for which an operation target is not set (that is a controller not used by the in-play user). Then, based on the terminal operation data D5, and the controller operation data D3 and the marker coordinate data D4 of the controller 7 for which an operation target is not set (hereinafter referred to as "the terminal operation data D5 and the like", the CPU 10 generates a terminal game image (that is, the setting change images shown in FIG. 7 to FIG. 9). The generated terminal game image is outputted from the game apparatus body 5 to the terminal device 6, and is displayed on the LCD 61 of the terminal device 6. It should be noted that a part or the whole of the process of generating the terminal game image may be performed by the GPU 32 in accordance with an instruction from the CPU 10.

In step S17, based on the terminal operation data D5 and the like, the CPU 10 determines whether an instruction to participate during the game is inputted by an observing user. When, the instruction to participate during the game has been inputted, the processing advances to step S18, and when the instruction to participate during the game has not been inputted, the processing advances to step S20 in FIG. 14.

In step S18, the CPU 10 updates the controller setting in the game setting information D2 in accordance with the instruction to participate during the game from the observing user.

In step S19, the CPU 10 causes a new player character to appear in the game world in accordance with the instruction to participate during the game from the observing user. Then, the processing advances to step S20 in FIG. 14.

After step S18 and step S19, the observing user becomes able to operate the player character that has newly appeared in the game world as his or her own player character. That is, the user who has been an observing user becomes a new in-play user.

Figure 14:
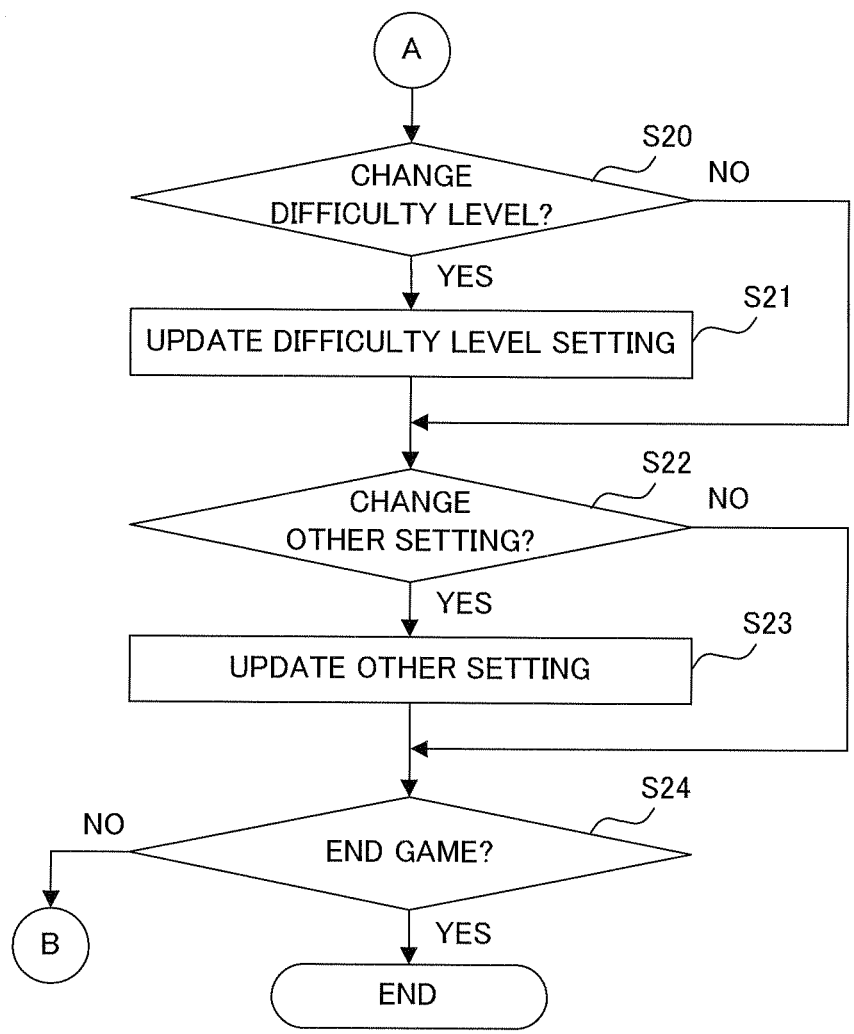
FIG. 14 is the other part of a non-limiting example of a flowchart showing a flow of game processing based on a game program D1.

In step S20 in FIG. 14, the CPU 10 determines whether an instruction to change the difficulty level has been inputted by an observing user, based on the terminal operation data D5 and the like. When the instruction to change the difficulty level has been inputted, the processing advances to step S21, and when the instruction to change the difficulty level has not been inputted, the processing advances to step S22.

In step S21, the CPU 10 updates the difficulty level setting in the game setting information D2 in accordance with the instruction to change the difficulty level from the observing user.

In step S22, the CPU 10 determines whether an instruction to change other settings has been inputted by an observing user, based on the terminal operation data D5 and the like. When the instruction to change other settings has been inputted, the processing advances to step S23, and when the instruction to change other settings has not been inputted, the processing advances to step S24.

In step S23, the CPU 10 updates other settings in the game setting information D2, in accordance with the instruction to change other settings from the observing user.

In step S24, the CPU 10 determines whether the game has ended. When the game has not ended, the processing returns to step S11 in FIG. 13, and when the game has ended, the CPU 10 ends executing the game program D1.

As described above, according to the exemplary embodiment, it is possible to change the settings of the game, by using a screen (the LCD 61) different from the screen (the monitor 2) that the in-play user views. Therefore, it is possible to change the settings of the game without hindering the progress of the game being played.

For example, when a new user is to participate in the game while the game is being played, the user can perform selection or the like of a desired character while viewing the character selection image and the like displayed on the LCD 61. Therefore, the new user can take time in selecting the desired character without feeling like imposing on the in-play user.

It should be noted that the above exemplary embodiment is merely an example.

For example, in the above exemplary embodiment, the plurality of processes shown in FIG. 13 to FIG. 14 are performed by one computer (the CPU 10). However, in another exemplary embodiment, these processes may be shared by a plurality of computers. In still another exemplary embodiment, some of these processes may be realized by means of a hardware circuit.

In the above exemplary embodiment, the plurality of processes shown in FIG. 13 to FIG. 14 are performed by one information processing apparatus (the game apparatus body 5). However, in another exemplary embodiment, these processes may be shared by a plurality of information processing apparatuses (for example, the game apparatus body 5 and a server apparatus).

In the above exemplary embodiment, the game program D1 is provided from the optical disc 4 to the game apparatus body 5. However, in another exemplary embodiment, the game program D1 may be provided from any computer-readable storage medium (for example, CD-ROM, semiconductor memory, or the like) to the game apparatus body 5. In still another exemplary embodiment, the game program D1 may be stored in advance in a nonvolatile memory (the ROM/RTC 13, the flash memory 17) in the game apparatus body 5. In still another exemplary embodiment, the game program D1 may be transmitted from another information processing apparatus (game apparatus or server apparatus) to the game apparatus body 5.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While the exemplary embodiments have been described in detail, the foregoing description is in all aspects illustrative and not restrictive. It is understood that numerous other modifications and variations can be devised.

What is claimed is:

1. A non-transitory computer-readable storage medium having stored therein a game program executed by a computer of a game apparatus, wherein the computer of the game apparatus performs game processing in accordance with a first input from a portable display device that includes an input section and with respective inputs from a plurality of controllers, each of the plurality of controllers used by a different user, generates a game image in accordance with a result of the game processing and causes one display device connected to the game apparatus to display the game image, the game program causing the computer to at least perform:

receiving the respective inputs from the plurality of controllers;

performing game processing based on the received inputs from the portable display device and the plurality of controllers;

generating a game image for common display at a common display device for display to users in accordance with a result of the performed game processing and causing the generated game image for common display to be displayed on the common display device that is different from the portable display device, wherein the common display device is not connected to any of the plurality of controllers;

causing, without suspending processes performed during the receiving of the respective inputs, during the game processing, and during the generating a game image, a setting image for changing a setting of the game processing to be displayed on the portable display device;

receiving a second input from the input section of the portable display device; and changing a setting of the game processing based on the received second input from the portable display device, wherein the game processing is performed based on a resultant setting due to the setting change, without suspending the processes performed during the receiving the respective inputs from the plurality of controllers, the game processing and the generating a game image, and wherein the setting image is not overlaid on the common game image displayed on the display device that is different from the portable display device.

2. The non-transitory computer-readable storage medium according to claim 1, wherein
the changing of the setting changes a game performance condition used in the processes performed by the input receiving, the game processing and the game image generation.

3. The non-transitory computer-readable storage medium according to claim 1, wherein
the changing of the setting changes a number of participants in the game.

4. The non-transitory computer-readable storage medium according to claim 1, wherein
the changing of the setting increases a number of participants in the game.

5. The non-transitory computer-readable storage medium according to claim 4, wherein
the portable display device displays a selection image for allowing a user who attempts to newly participate in the game to select an operation character.

6. The non-transitory computer-readable storage medium according to claim 1, wherein
the changing of the setting reduces a number of participants in the game.

7. The non-transitory computer-readable storage medium according to claim 6, wherein
the portable display device displays a selection image for allowing a user to select an operation character that the user attempts to cause to leave the game.

8. The non-transitory computer-readable storage medium according to claim 1, wherein
the changing of the setting changes an operation character of a user participating in the game.

9. The non-transitory computer-readable storage medium according to claim 1, wherein
the changing of the setting changes a difficulty level of the game.

10. The non-transitory computer-readable storage medium according to claim 1, wherein
the game processing controls one or more operation characters in a game world based on respective inputs received from the plurality of controllers, and
based on information indicating correspondence relationship between the plurality of controllers and the one or more operation characters, and based on the input received by the input section of the portable display device and an input from a controller that is not associated with any of the one or more operation characters, the setting of the game processing is changed.

11. The non-transitory computer-readable storage medium according to claim 10, wherein
the changing of the setting increases a number of participants in the game, based on an input from the input device that is not associated with any of the one or more operation characters, and
after the number of participants in the game has been increased by the setting change, the game processing performs the game processing also based on the input from the controller that is not associated with any of the one or more operation characters.

12. The non-transitory computer-readable storage medium according to claim 1, wherein
the input section of the portable display device includes a pointing device.

13. The non-transitory computer-readable storage medium according to claim 1, wherein
the computer causes the setting image to be displayed on the portable display device by wireless transmission.

14. The non-transitory computer-readable storage medium according to claim 1, wherein
the computer causes compression of the setting image and outputs a resultant image to the portable display device.

15. The non-transitory computer-readable storage medium according to claim 1, wherein
the input section of the portable display device receives an input from a controller not in use for performing the game processing instead of an input from the input section of the portable display device.

16. The non-transitory computer-readable storage medium according to claim 1, wherein
the second input from the input section of the portable display device is not to be used for the game processing.

17. The non-transitory computer-readable storage medium according to claim 1, wherein
an input from a controller not in use is receivable, as the second input, via the portable display device, and
the setting of the game processing is changeable on the basis of the input from the controller not in use.

18. The non-transitory computer-readable storage medium according to claim 1, wherein
display of the setting image starts in accordance with starting of the game processing, and the display of the setting image ends in accordance with ending of the game processing.

19. A game apparatus that performs game processing in accordance with a first input from a portable display device that includes an input section and with respective inputs from a plurality of controllers, each of the plurality of controllers used by a different user, the game apparatus generating a game image in accordance with a result of the game processing and causing one display device connected to the game apparatus to display the game image and comprising a computer configured to perform at least:

receiving the respective inputs from the plurality of controllers;

performing game processing based on the received inputs from the portable display device and the plurality of controllers;

generating a game image for common display at a common display device for display to users in accordance with a result of the game processing performed by the computer and causing the generated game image for common display to be displayed on the common display device that is different from the portable display device, wherein the common display device is not connected to any of the plurality of controllers;

causing, without suspending processes performed during the receiving the respective inputs from the plurality of controllers, the game processing, and the generating a game image, a setting image for changing a setting of the game processing to be displayed on the portable display device;

receiving a second input from the input section of the portable display device; and changing a setting of the game processing based on the received second input from the portable display device, wherein the computer performs the game processing based on a resultant setting due to the setting change, without suspending the processes performed during the receiving the respective inputs from the plurality of controllers, the game processing, and the generating a game image, and wherein the setting image is not overlaid on the common game image displayed on the display device that is different from the portable display device.

20. A game system that performs game processing in accordance with a first input from a portable display device that includes an input section and with respective inputs from a plurality of controllers, each of the plurality of controllers used by a different user, the game system generating a game image in accordance with a result of the game processing and causing one display device connected to the game system to display the game image and comprising a computer configured to perform at least:

receiving the respective inputs from the plurality of controllers;

performing game processing based on the received inputs from the portable display device and the plurality of controllers;

generating a game image for common display at a common display device for display to users in accordance with a result of the game processing performed by the computer and causing the generated game image for common display to be displayed on the common display device that is different from the portable display device, wherein the common display device is not connected to any of the plurality of controllers;

causing, without suspending processes performed during the receiving the respective inputs from the plurality of controllers, the game processing, and the generating a game image, a setting image for changing a setting of the game processing to be displayed on the portable display device;

receiving a second input from the input section of the portable display device; and changing a setting of the game processing based on the received second input from the portable display device, wherein the computer performs the game processing based on a resultant setting due to the setting change, without suspending the processes performed during the receiving the respective inputs from the plurality of controllers, the game processing, and the generating a game image, and wherein the setting image is not overlaid on the common game image displayed on the display device that is different from the portable display device.

21. A game processing method for performing game processing in accordance with a first input from a portable display device that includes an input section and with respective inputs from a plurality of controllers, each of the plurality of input devices used by a different user, generating a game image in accordance with a result of the game processing and causing one display device connected to a game apparatus to display the game image, the method comprising:

receiving the respective inputs from the plurality of input devices;

performing game processing, via one or more computer processors, based on the received inputs from the portable display device and the plurality of controllers;

generating a game image for common display at a common display device for display to users in accordance with a result of the game processing, wherein the common display device is not connected to any of the plurality of controllers;

displaying the generated game image for common display on the common display device that is different from the portable display device;

displaying, without suspending the receiving of the respective inputs, the game processing, the generating the game image, and the displaying the game image, a setting image for changing a setting of the game processing on the portable display device;

receiving a second input from the input section of the portable display device; and changing a setting of the game processing based on the second input received from the input section, wherein the game processing is performed based on a resultant setting due to the setting change, without suspending the receiving the respective inputs from the plurality of controllers, the game processing, the generating a game image, and the displaying the game image, and wherein the setting image is not overlaid on the common game image displayed on the display device that is different from the portable display device.

22. A game apparatus that performs game processing in accordance with a first input from a portable display device for an observing user that includes an input section and with an input from a plurality of controllers, each of the plurality of controllers associated with a respective in-play user, the game apparatus generating a game image in accordance with a result of the game processing and causing one display device connected to the game apparatus to display the game image and comprising a computer configured to at least perform:

receiving the respective inputs from the plurality of input devices;

performing game processing based on the received inputs from the portable display device and the plurality of controllers;

generating a game image for common display at a common display device for display to in-play users in accordance with a result of the performed game processing and causing the generated game image for common display to be displayed on the common display device that is different from the portable display device, wherein the common display device is not connected to any of the plurality of controllers;

causing, without suspending processes performed during the receiving of the respective inputs, during the game processing, and during the generating a game image, a setting image for changing a setting of the game processing to be displayed on the portable display device;

receiving a second input from the input section of the portable display device; and changing a setting of the game processing based on the received second input from the portable display device, wherein the game processing is performed based on a resultant setting due to the setting change, without suspending the processes performed during the receiving the respective inputs from the plurality of controllers, the game processing and the generating a game image, and wherein the setting image is not overlaid on the common game image displayed on the display device that is different from the portable display device.

* * * * *